United States Patent [19]

Hill

[11] Patent Number: 4,561,621

[45] Date of Patent: Dec. 31, 1985

[54] TILTABLE VEHICLE SEAT FOR BACKHOES OR THE LIKE

[75] Inventor: Kevin E. Hill, Milwaukee, Wis.

[73] Assignee: Milsco Manufacturing Company, Milwaukee, Wis.

[21] Appl. No.: 523,783

[22] Filed: Aug. 17, 1983

[51] Int. Cl.[4] .............................................. B60N 1/08
[52] U.S. Cl. .................................... 248/397; 248/423; 297/328
[58] Field of Search ............ 248/397, 371, 421, 372.1, 248/394–398, 423; 297/313, 337, 326–328, 316

[56] References Cited

U.S. PATENT DOCUMENTS

| | | | |
|---|---|---|---|
| 1,788,113 | 1/1931 | Leach | 248/397 |
| 1,855,245 | 4/1932 | Kuenzel | 248/423 |
| 2,292,414 | 8/1942 | Vernon | 297/313 |
| 3,304,044 | 2/1967 | Campbell | 248/371 |
| 3,741,511 | 6/1973 | Streeter | 248/371 |
| 3,975,050 | 8/1976 | McKee | 248/371 |
| 4,089,499 | 5/1978 | Ware | 248/631 |
| 4,155,593 | 5/1979 | Sevenson | 297/284 |
| 4,168,050 | 9/1979 | Nerem | 297/328 |
| 4,304,384 | 12/1981 | Cremer | 297/313 |
| 4,384,741 | 5/1983 | Flum | 297/304 |
| 4,385,743 | 5/1983 | Werner | 297/328 |

FOREIGN PATENT DOCUMENTS

| | | | |
|---|---|---|---|
| 207701 | 7/1959 | Austria | 297/328 |
| 2546883 | 4/1977 | Fed. Rep. of Germany | 248/396 |
| 787687 | 9/1935 | France | 297/328 |
| 2508298 | 12/1982 | France | 297/313 |
| 1384746 | 2/1975 | United Kingdom | 248/421 |

*Primary Examiner*—Reinaldo P. Machado
*Assistant Examiner*—Alvin Chin-Shue
*Attorney, Agent, or Firm*—James E. Nilles

[57] ABSTRACT

An earth working vehicle such as a backhoe having an earth working bucket to form an excavation in the ground at the rear end of the vehicle and the operator must visually observe the excavation being done, a tiltable seat assembly including a seat support frame, an operator's seat secured to said frame, a resilient support for supporting said seat on said frame, a pivot support for pivotally connecting the support frame about a transverse horizontal axis to the vehicle to permit the support frame, the seat and the resilient support to tilt as a unit about the transverse axis and consequently tilt an operator in the seat for better visibility of the area being excavated. A vehicle seat assembly including a seat having a front edge and a seat pan for supporting the seat, a seat rake adjustment located beneath the pan and the front edge for vertically adjusting the latter relative to the rest of the seat; the adjustment means comprises a bracket secured to the underside of said pan and having a plurality of notches therein, a generally vertically extending hook latch having a hook at its lower end for swingably mounting said latch on the seat assembly, the latch having an upper end selectively engageable in the notches, an operator handle having an upper end and a lower end and pivotally mounted intermediate its length on the assembly, the handle upper end being secured to the seat front edge for manipulation by the operator to adjust the height of the seat edge, the lower end of said handle being engageable with the latch to shift the latch out of engagement with the notches when the operator pushes downwardly on the front edge of the seat.

8 Claims, 14 Drawing Figures

TILTABLE VEHICLE SEAT FOR BACKHOES OR THE LIKE

BACKGROUND OF THE INVENTION

1. Field of Use

This invention relates generally to vehicle seat for earth working machinery such as backhoes, and in particular to means for permitting tilting of the seat about a horizontal transverse axis.

2. Description of the Prior Art

Adjustable vehicle seats of the prior art include swivel seats, backward and forward shiftable seats, deformable seats which permit raising or lowering of the leading edge of the seat, and vertically adjustable seats. Examples of vehicle seats having the features described above may be found in commonly assigned U.S. Pat. No. 4,155,593 issued May 22, 1979, to Swenson and U.S. Pat. No. 4,014,507 issued Mar. 29, 1977, to Swenson, and commonly assigned and co-pending U.S. patent application Ser. No. 384,035 to Uecker et al Ser. No. 661,263 as a continuation-application. A seat tilting device is also shown in U.S. Pat. No. 4,384,741 issued May 24, 1983.

Notwithstanding all of the prior art adjustment features, an occupant's comfort and convenience are not completely provided for by such seats in certain circumstances, such as in the operation of a backhoe where the operator must have good vision into the excavation at the rear of the backhoe.

OBJECTS AND SUMMARY OF THE INVENTION

Objects of the present invention are to provide a vehicle seat for a backhoe or the like and which may be tilted about a horizontal, transverse axis to permit the operator to lean over the rear of the vehicle and peer into the excavation;

to provide such a tiltable vehicle seat which has means to releasably lock the seat in a plurality of desired tilted positions; and to provide a tiltable vehicle seat having a leading edge of the seat which may be vertically adjusted to assist in restraining a seat occupant within the seat when the seat is tilted downwardly.

In accordance with the invention, there is provided a vehicle seat which comprises a seat assembly including a seat which is pivotally secured to a support permitting the seat to be tilted about a horizontal, transverse, pivotal axis. Lock means are provided for releasably securing the seat in a plurality of tilted positions, which lock means comprises a stationary lock member secured to the support and having a pair of laterally spaced vertical side plates. The side plates are laterally spaced apart from one another to permit the seat to pass unobstructed between the plates when the seat is tilted. Each plate is provided with a notched or serrated rear edge to define a plurality of notches on its rear edge. The notches of each plate are horizontally aligned for receiving a lock bar pivotally secured to the seat suspension. The lock bar is horizontal and sized to be received within horizontally aligned notches when pivoted to a lock position. The lock bar is provided with a handle engageable by a seat occupant to pivot the lock bar to be moved to a release position with the lock bar free of the notches and clear of the side plates whereby the seat and pivotally secured lock bar may be freely tilted to a desired tilted position. Spring means are provided for urging the lock bar to pivot to a lock position and be received within horizontally aligned notches when the seat attains a desired tilted position and the seat occupant releases the handle.

Another aspect of the invention relates to improved seat rake adjustment means which are provided at the leading edge of the seat to vertically adjust the leading edge of the seat. This adjustment helps retain the occupant securely and comfortably in the seat, particularly when the seat is tilted to provide better vision of the excavated area, as will appear. The seat rake adjustment means comprises a seat rake adjustment plate disposed between the seat pan and resilient material at the leading edge of the seat.

Other objects and advantages of the invention will hereinafter appear.

DESCRIPTION OF A PREFERRED EMBODIMENT

Figure 11:
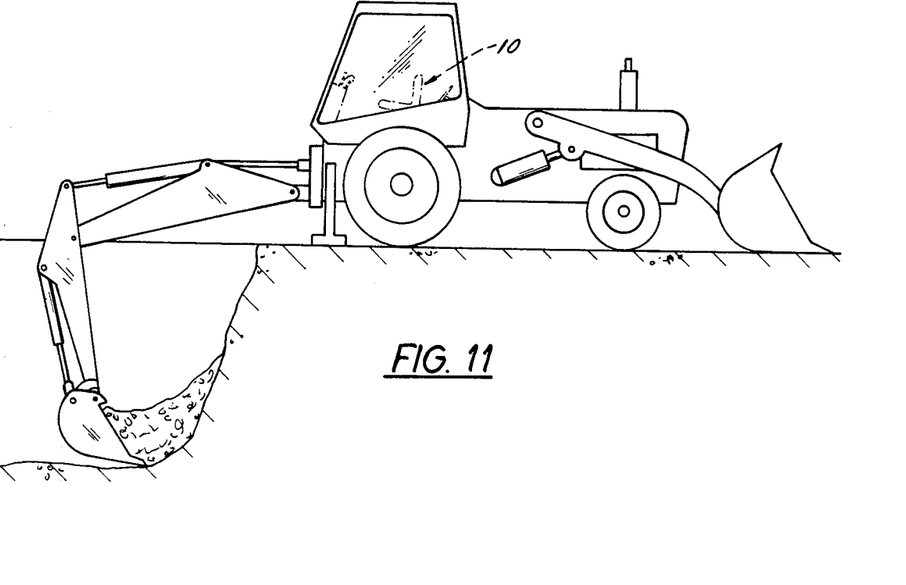
FIG. 11 is a side elevational view of a backhoe digging an excavation and where the invention finds particular utility.

The improved vehicle seat finds particular utility when used in the environment shown in FIG. 11. The improved apparatus includes a seat assembly 10 (FIG. 1), a suspension assembly 11, and a tilt lock assembly 12, all mounted on a pedestal support 13. The pedestal support 13 is secured to a platform or floor 14 of a vehicle such as an earth working backhoe.

The seat assembly comprises a rigid sheet metal seat pan 15 formed to provide a backrest portion 16 and a seat portion 17. A seat cushion of shaped or contoured layers or blocks 18 and 19 of resilient compressible material, such as foam, sponge rubber or the like, are fixed upon the seat portion 17 and the backrest portion 16, respectively, of the seat pan 15. Flexible exterior upholstery covers 20 and 21 of vinyl fabric or the like are secured around blocks 18 and 19, respectively. An edging or finishing strip 22 (FIGS. 8 and 9) secures the cover to the seat pan 15.

Figure 1:
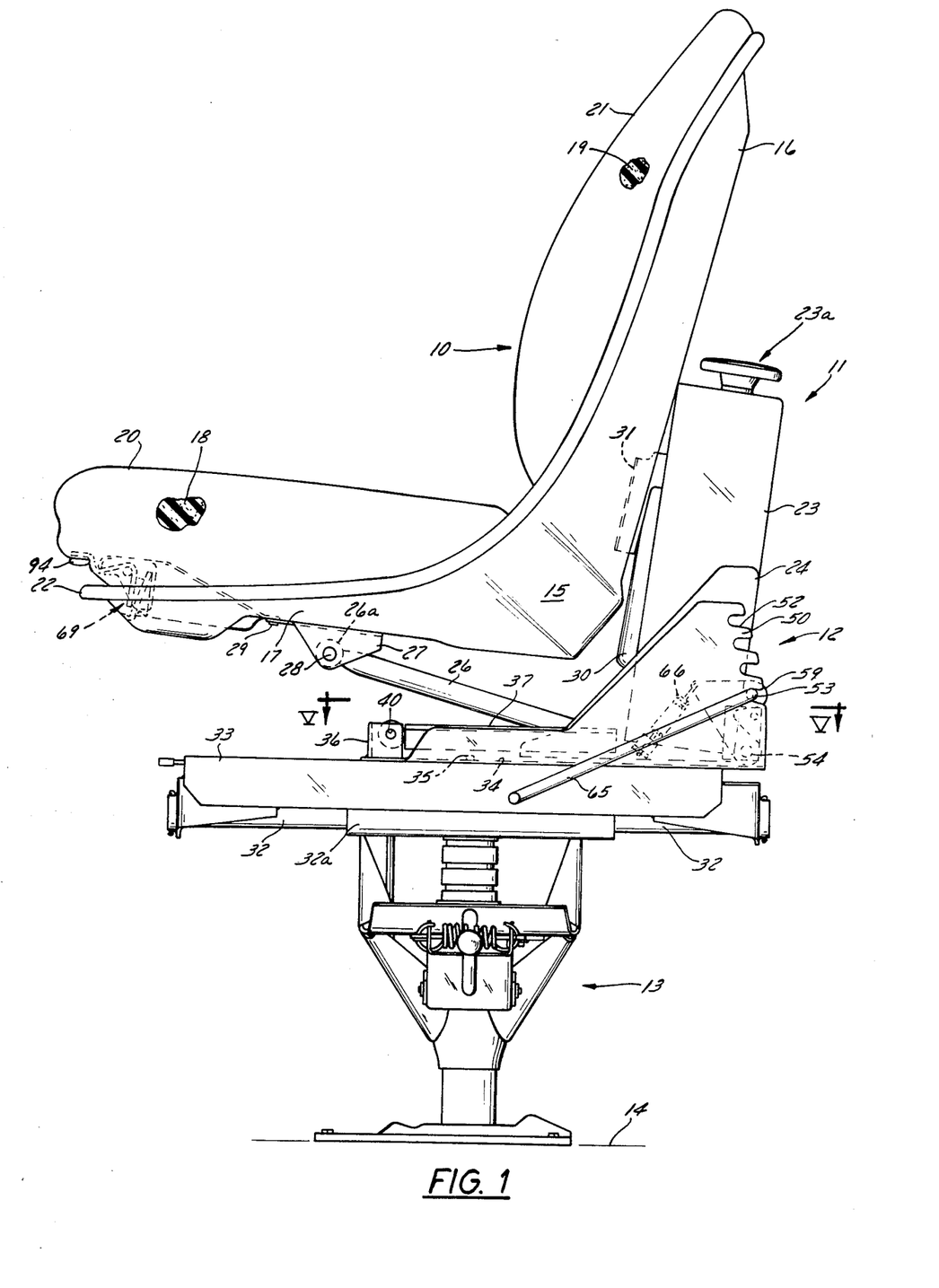
FIG. 1 is a side elevational view of a vehicle seat in accordance with the invention showing the seat in an untilted horizontal position.
Figure 1A:
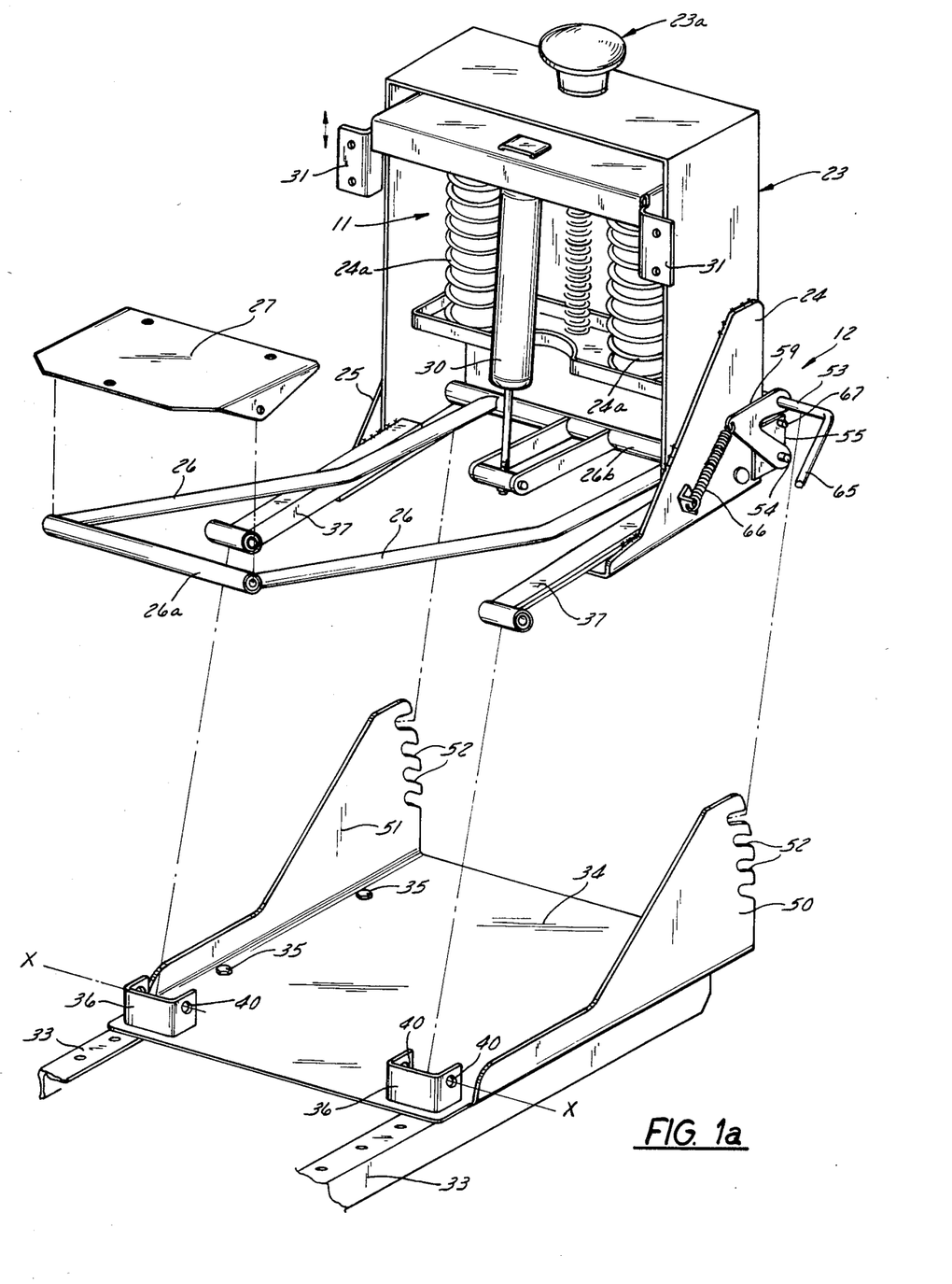
FIG. 1a is a fragmentary, exploded, perspective view of the pivotal, transverse mounting of the seat assembly shown in FIG. 1, on an enlarged scale.

The seat assembly 10 is resiliently supported for vertical motion by means of the suspension assembly 11 which comprises a rigid support frame 23 having a pair of laterally spaced apart side plates 24 and 25 secured to the bottom of the support frame 23. The support frame 23 is positioned behind the backrest portion 16 of the seat assembly 10 and is also secured to the seat assembly 10 by means of a pair of tie rods 26 (FIG. 1a). The tie rods 26 are rigidly secured together at their forward ends by a cross tube 26a. The rear ends of the rods 26 are rigidly connected together by a cross shaft 26b. Shaft 26b is supported on the stationary frame 23. The tube 26a is connected by pin 28 to bracket 27. Bracket 27 is secured to the center of the bottom of the seat portion 17 by bolts 29.

The support frame 23 houses suspension assembly 11 and a shock absorber 30, all of which is shown in the said U.S. patent application Ser. No. 384,035. The seat assembly 10 is operably connected to the suspension apparatus by means of formed bracket 31 (FIGS. 1, 1a, 2) secured to the back of the backrest portion 16 of the seat pan 15 and secured to the suspension apparatus within the support frame 23. Screw adjustment means 23a are provided for adjusting the compression of the two springs 24a. The suspension apparatus permits vertical motion of the seat (relative to the support frame 23) which is dampened to absorb shocks and provide comfort for a seat occupant. Such a suspension assembly 11 is described more fully in commonly assigned and co-pending U.S. patent application Ser. No. 384,035.

The pedestal 13, secured to the floor 14, is a swivel pedestal such as is more fully described in commonly assigned U.S. Pat. No. 4,014,507. It is believed sufficient to say that the pedestal 13 includes a pair of laterally spaced apart slide tubes 32 (only one shown); a pair of laterally spaced apart top rails 33 which are fixed to tubes 32 which in turn are slidably engaged in guide tubes 32a of the riser assembly. Accordingly, the suspension assembly 11 and, hence, the seat assembly 10 which is attached to the suspension assembly 11 may be moved rearward or forward by moving the top rails 33 (FIG. 1) along with the slide tubes 32 since the suspension assembly 11 is secured to the top rails 33 in a manner which will now be described.

A rigid metal support plate 34 is provided extending between and resting upon the top rails 33 of the pedestal 13. The support plate 34 is suitably secured, such as by bolts 35, to the top rails 33 to permit the support plate 34 to ride with the top rails 33 and slide tubes 32 as it slides in the guide tubes 32a. The support frame 23 of the suspension assembly 11 is pivotally secured to the support plate 34 by a pair of laterally spaced mounting brackets 36 (FIGS. 1, 1a, 2, 4 and 5) and rigid support braces 37 pivoted thereto.

The mounting brackets 36 are welded to the support plate 34 and have axially aligned holes 40 which define the transverse pivotal axis X—X. The pivotal axis X—X is beneath the center of gravity of an occupied seat and suspension assembly. This pivot axis permits the seat unit to tilt by the operator's weight shift and the operator's height does not significantly change.

The support braces 37 are welded to the side plates 24 and 25, respectively, of the support frame 23. The support braces 37 extend from the side plates toward the mounting bracket 36 and terminate at its free end where it is pivoted to the brackets as mentioned. With the support brace 37 pivotally connected to the support plate 34 and rigidly connected (as by welding) to the support frame 23 of the suspension assembly 11, the suspension assembly 11 and the attached seat assembly 10 may be pivoted about axis X—X to permit the seat assembly to be variably tilted relative to the support plate 34.

TILT LOCK ASSEMBLY

Figure 3:
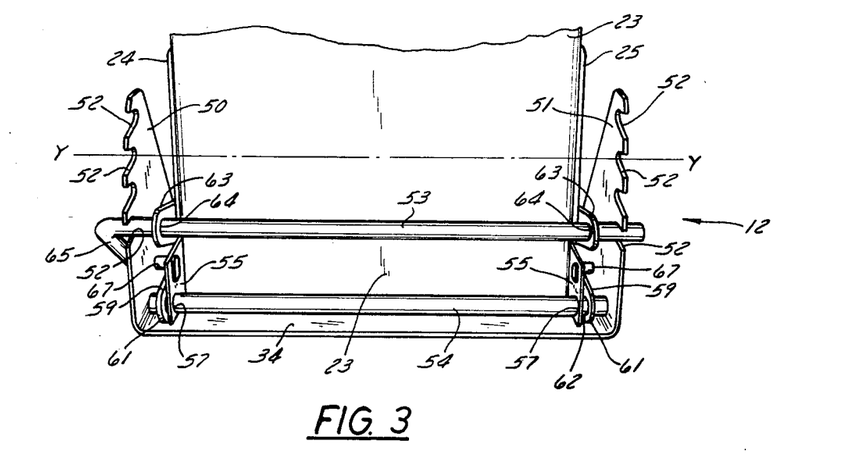
FIG. 3 is a rear elevational view of a portion of the vehicle seat shown in FIG. 1 showing a tilt lock assembly according to the present invention.
Figure 3A:
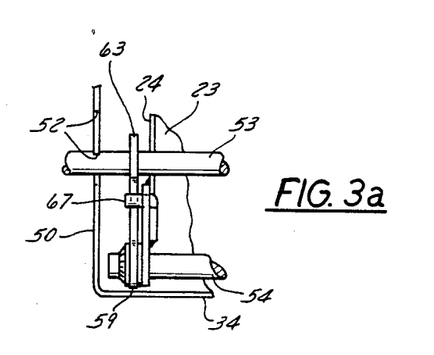
FIG. 3a is a fragmentary, rear elevational view of a portion of the assembly shown in FIG. 3.
Figure 5:
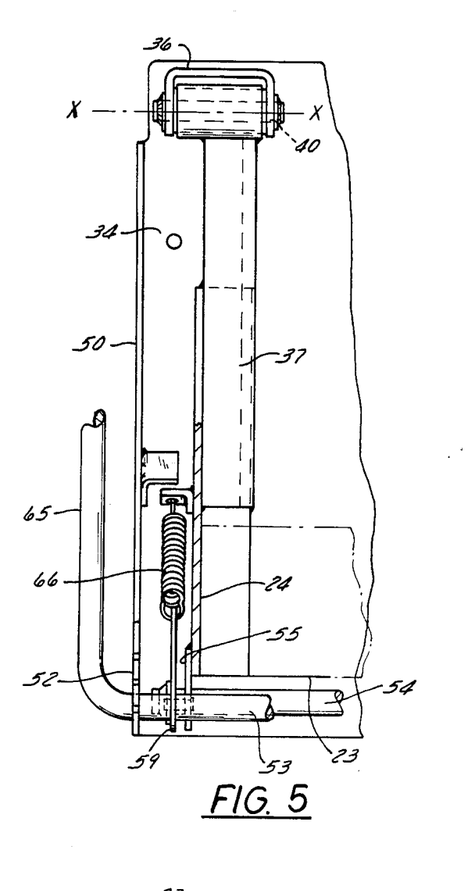
FIG. 5 is a fragmentary top view of a portion of the seat assembly taken along line V—V of FIG. 1.
Figure 7:
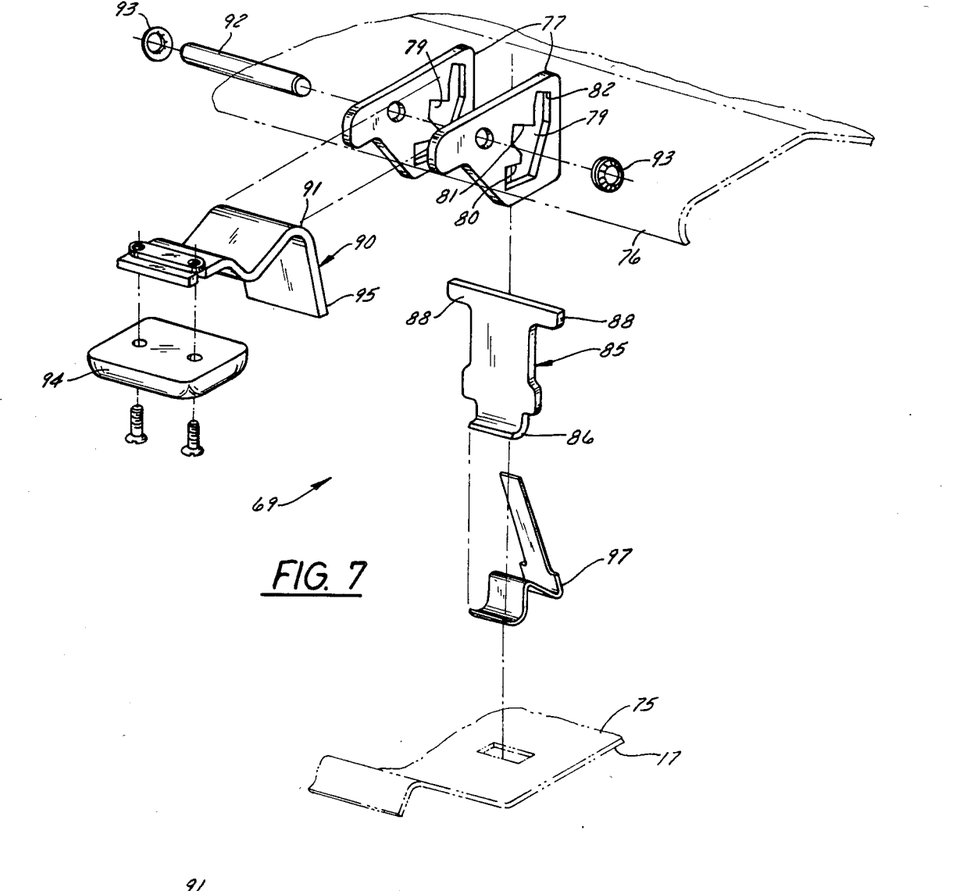
FIG. 7 is an exploded view of a front portion of the seat assembly shown in FIGS. 1, 8 and 9, and showing the improved seat rake adjustment assembly.

The tilt lock assembly 12 is provided to releasably lock the seat and suspension assemblies in a plurality of tilted positions. The lock assembly 12 includes a U-shaped, stationary lock member comprising the support plate 34 and a pair of parallel laterally spaced apart side plates 50 and 51. As is more fully shown in FIG. 3, the side plates 50 and 51 are integrally formed with the support plate 34 and are spaced apart a distance sufficient to receive the support frame 23 of the suspension assembly and to permit unobstructed movement of the suspension assembly 11 as it rotates about pivotal axis X—X.

As shown in FIGS. 1, 2, 3, 4 and 5, the trailing or rear edges of side plates 50 and 51 are arcuate to define a plurality of notches 52 along their rear edge. The notches 52 of plate 50 are aligned with the notches 52 of plate 51 such that a common axis Y—Y extending between the notches is parallel with the support plate and, hence, with pivotal axis X—X.

The tilt lock assembly 12 also includes a movable lock bar 53 pivotally connected to the support frame 23, and is adapted to releasably engage the stationary lock member. To pivotally secure the lock bar 53 to the support frame 23, a hinge bar 54 is secured to the support frame 23 by mounting brackets 55 having axially aligned holes 57 to receive hinge bar 54. The axis of the hinge bar 54 is parallel to the pivotal axis X—X. Thus, the lock bar 53 is spaced from and swingably connected to the hinge bar 54 by means of the hinge plates 59. The bell-crank shaped hinge plates 59 have an end 63 with holes 64 which rotatably receive the lock bar 53. The hinge plates 59 are sized such that the lock bar 53 is retained parallel to the pivotal axis X—X. The lock bar 53 is of axial dimension sufficient to extend past the side plates 50 and 51 of the stationary lock member and sized to be selectively received within aligned notches 52.

A handle 65 is provided on one outer end of the lock bar 53 and extends along the exterior of the left side plate 50 of the stationary lock member. A pair of springs 66 are provided on the left and right side plates of the suspension assembly support frame and are connected between the side plates and the hinge plates to bias the latter to the locking position of the bar 53. A pair of stop pins 67 provided on brackets 55 limit rearward travel of bell-cranks 59.

By operation of the tilt lock assembly 12, a seat occupant may selectively vary the tilt position of the seat assembly 10. In FIG. 1, the seat assembly 10 is shown in a first, or untilted position, the lock bar 53 being received within the lowermost notches of the side plates 50 and 51 with the springs 66 urging the lock bar 53 within the notches and securing the seat assembly in the position shown.

Figures 2, 4, 6:
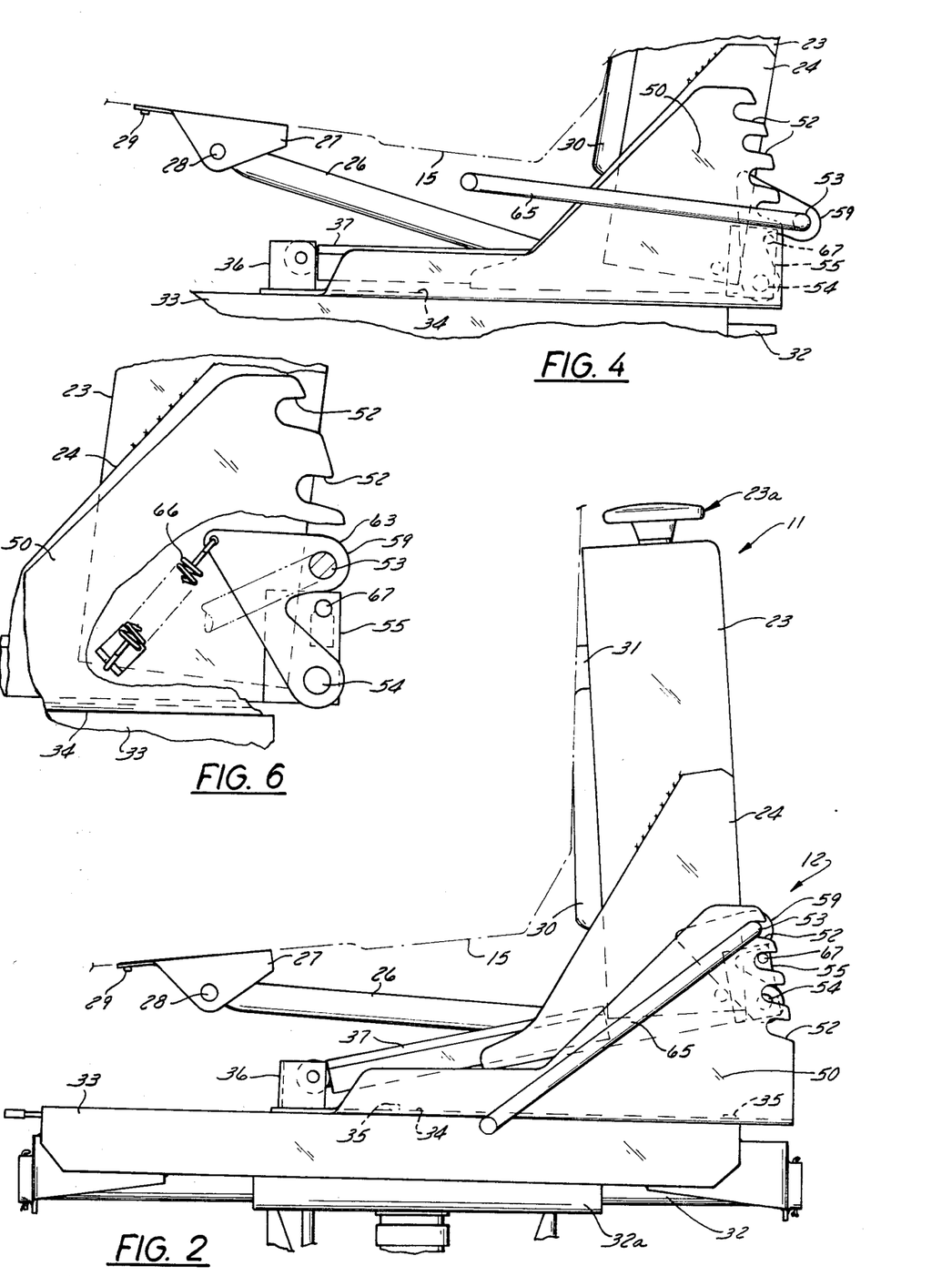
FIG. 2 is a fragmentary view similar to that of FIG. 1 but showing the seat in a full tilted position.
FIG. 4 is a side elevational view of the tilt lock assembly showing the seat in an untilted or normal position and with the lock assembly released.
FIG. 6 is a fragmentary side elevational view of a portion of the tilt lock assembly shown in FIG. 4, but on an enlarged scale and with parts broken away for clarity.

An occupant may unlock the tilt lock mechanism by engaging the handle 65 and moving the lock bar 53, against the bias of the springs, out of the lock position to a release position as shown in FIG. 4 where the lock bar 53 is clear the side plate notches. With the lock bar 53 in the release position, the seat assembly 10 is now freely rotatable about the axis X—X and may be rotated to a desired tilt position, for example, a maximum downward tilt position as shown in FIG. 2, where it can again be locked in position.

With the above-described structure, the entire tilt adjust apparatus, together with the suspension assembly 11, can be tilted about axis X—X and the suspension assembly remains operative in any tilted position of the seat assembly. The desired degree of tilt of the seat can be easily obtained by a slight shifting of the operator's weight. The pivot point is directly under the center of gravity of the combined weight of the suspension assembly and the operator. This results in no appreciable change in height of the operator.

Seat Rake Adjustment

To assist in restraining the operator in the seat, when the seat is in a tilted position, a seat rake adjustment means 69 is provided and reference is now drawn to FIGS. 7-10. The seat pan 15 is provided with a generally flat seat portion 17 having a recessed portion 70 centrally located along the leading edge of the seat pan 15. The recessed portion is defined in part by a generally flat floor portion 75.

Figure 8:
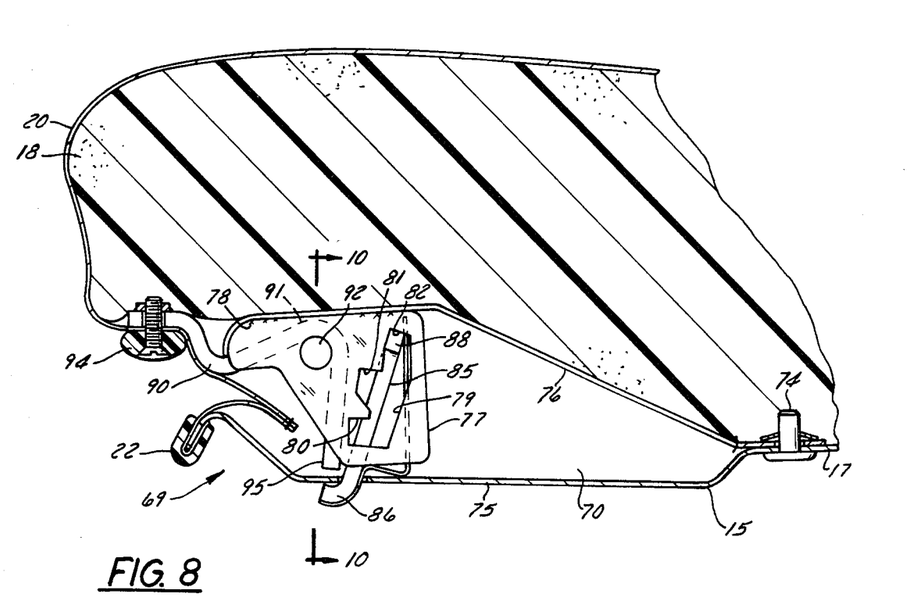
FIG. 8 is a cross-sectional side elevational view of the seat rake adjustment assembly in a fully retracted position.
Figure 9:
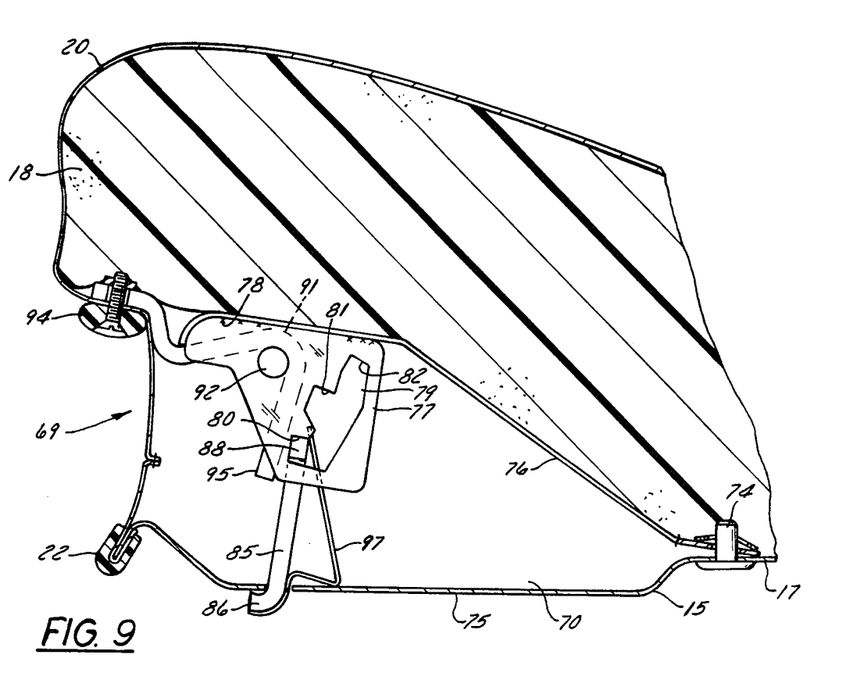
FIG. 9 is a view similar to FIG. 8 but showing the seat rake adjustment assembly in a fully raised position.
Figure 10:
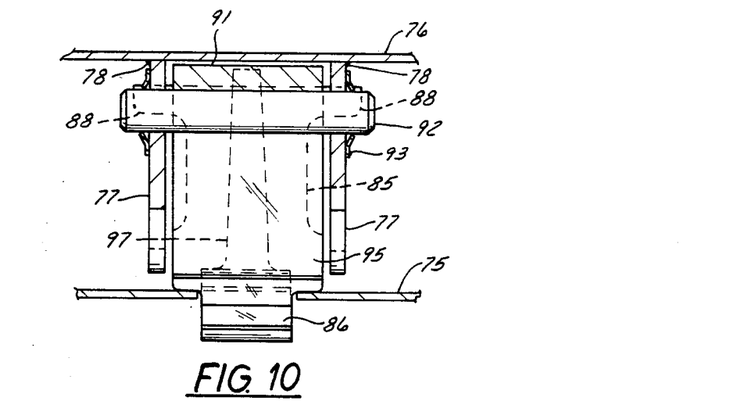
FIG. 10 is a front elevational view of the seat rake adjustment, the view being taken along line 10—10 in FIG. 8.

A seat rake adjustment includes a pair of laterally spaced apart, notched brackets 77 which are welded as at 78 to the rake adjustment pan 76 pivoted at 74 to the seat portion 17. An aperture is formed in each of the brackets and defines a lower notch 80, an intermediate notch 81 and an upper notch 82. A hook latch 85 has a lower hook portion 86 which extends through an aperture in the floor portion 75 and its upper end has laterally extending ears 88 which can be selectively engaged by the notches in the brackets. As shown in FIG. 9, the hook latch is engaged in the lower notch 80 so as to position the seat edge in the upper position. In FIG. 8 the upper end of the hook latch is engaged in the upper end of the upper notch 82 and in that position the seat edge is in the lowermost position. The hook latch is adjusted through the handle 90 which has a curved portion 91 that fits over and is retained by a shaft 92 which in turn extends through aligned apertures in the bracket 77 and is held captive therein by the locking rings 93 engaged in each end of the shaft 92. The forward end 94 of the handle can be pulled upwardly by the operator which causes the lower end 95 of the handle to be pulled away from the hook latch, thereby permitting the plate spring 97 to urge the hook latch ears into the notches of the brackets 77. In other words, when the operator wishes to adjust the front edge of the seat to an upward position as shown in FIG. 9, he simply pulls up on the handle end 94 and this permits the front edge of the seat to move upwardly, and the front end of the hook latch slides out of the notches and is swung to the rear, against the bias of the spring, until the ears of the hook latch are again located in the selected pair of notches, as shown in FIG. 9. In order for the operator to adjust the front edge of the seat downwardly, for example to the position shown in FIG. 8, it is only necessary for him to push downwardly on the front edge of the seat. This causes the lower end of the handle 95 to push the hook latch out of engagement with the notches of the bracket 77, thereby permitting the front edge of the seat to be pushed downwardly. When the seat is in the downwardly adjusted position, the operator no longer pushes down on the seat, and this permits the lower end of the handle 95 to swing clear of the hook latch 85, thereby permitting the spring 97 to urge the hook latch into the selected notches.

With this seat rake adjustment, the operator simply pushes down on the front edge of the seat to move the front edge to a downward position. To move the front edge of the seat to an upper position, it is only necessary for the operator to reach under the front edge of the seat and pull upwardly on the handle end 94. Thus, the operator simply pushes or pulls the seat in the direction he wishes to move it.

Figure 12:
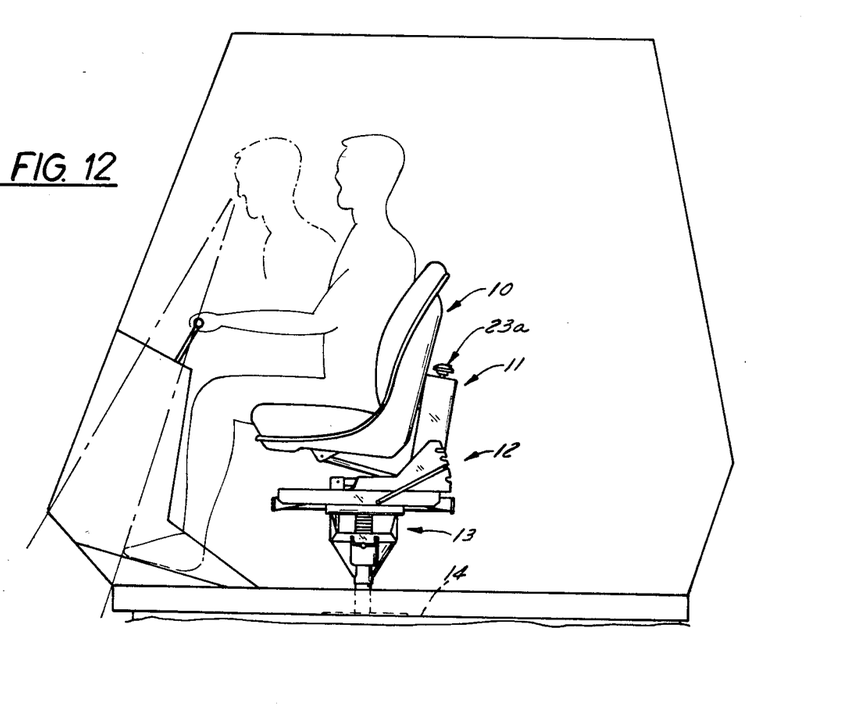
FIG. 12 is a schematic view of an operator in the backhoe and indicating his line of sight into the excavation.

The seat rake adjustment compensates for the seat tilting and provides adequate but not undue thigh pressure and ergonomic thigh and back angles of the operator. The result is a secure and supportive seat station in any of the tilted positions. The eye position and line of sight of the operator is translated over the work area (FIG. 12) without translating the position of the seat a corresponding amount, resulting in minimizing the possibility of interference with the controls or pinch points.

I claim:

1. In an earth working vehicle, a tiltable seat assembly adjacent said vehicle rear end and comprising: a seat support frame including an operator's seat secured to said frame, and also including resilient means in the form of vertically arranged springs located between said seat and said seat support frame for supporting said seat on said frame, pivot support means for pivotally connecting said tiltable seat assembly including said seat and said support frame about a transverse horizontal axis to said vehicle adjacent said rear end thereof to permit said support frame and its seat and resilient support means to tilt forwardly as a unit about said transverse horizontal axis and consequently tilt an operator forwardly in said seat.

2. The vehicle set forth in claim 1 including lock means acting between said support frame and said vehicle for releasably securing said seat in said unit in any one of a plurality of tilted positions.

3. The vehicle as described in claim 2 further characterized in that said lock means includes a stationary lock member rigidly secured to said vehicle and having a pair of upwardly extending notched side walls having notches at the rear end thereof, said unit having a releasable lock bar selectively engageable in said notches.

4. The vehicle set forth in claim 3 further characterized in that said pivot support means includes a pair of longitudinally extending spaced apart arms pivotally connected at one of their ends to said stationary lock member.

5. The vehicle set forth in claim 1 including seat rake adjustment means mounted on said seat for adjustment by said operator and for selectively changing the height of the front edge of said seat relative to the rest of said seat to thereby securely support said operator in said seat regardless of the tilted position thereof.

6. The vehicle set forth in claim 1 further characterized in that said pivot support means includes a pair of longitudinally extending spaced apart arms pivotally connected at one of their ends to said vehicle.

7. In an earth working vehicle such as a backhoe wherein an earth working bucket or the like is operative to form an excavation in the ground and at the rear end of the vehicle and the operator is positioned on a vehicle seat located adjacent said rear end of said vehicle whereby the operator must visually observe the excavation being done, a tiltable seat assembly adjacent said vehicle rear end and comprising: a seat support frame including an operator's seat secured to said frame, and also including resilient means in the form of vertically arranged springs located between said seat and said seat support frame for supporting said seat on said frame, pivot support means for pivotally connecting said tiltable seat assembly including said seat and said support frame about a transverse horizontal axis to said vehicle adjacent said rear end thereof to permit said support frame and its seat and resilient support means to tilt forwardly as a unit about said transverse horizontal axis and consequently tilt an operator forwardly in said seat for better visibility of the area being excavated; lock means acting between said seat and said unit in any one of a plurality of tilted positions; said lock means including a stationary lock member rigidly secured to said vehicle and having a pair of upwardly extending notched side walls having notches at the rear end thereof, said unit having a releasable lock bar selectively engageable in said notches; seat rake adjustment means mounted on said seat for adjustment by said operator and for selectively changing the height of the front edge of said seat relative to the rest of said seat to thereby securely support said operator in said seat regardless of the tilted position thereof; said pivot support means including a pair of longitudinally extending spaced apart arms pivotally connected at one of their ends to said vehicle.

8. In a vehicle seat assembly, a seat having a front edge and a seat pan for supporting said seat, a seat rake adjustment pan pivoted to said seat pan, seat rake adjustment means located beneath said seat rake adjustment pan and said front edge for vertically adjusting the latter relative to the rest of the seat, said adjustment means comprising: bracket means secured to the underside of said seat rake adjustment pan and having a plurality of notches therein, a generally vertically extending hook latch having a hook at its lower end for swingably mounting said latch on said assembly, said latch having an upper end selectively engageable in said notches, an operator handle having an upper end and a lower end and pivotally mounted intermediate its length on said assembly, said handle upper end being secured to said seat front edge for manipulation by said operator to adjust the height of said edge, said lower end of said handle engageable with said latch to shift said latch out of engagement with said notches when said operator pushes downwardly on said edge.

* * * * *